(12) United States Patent
Hill

(10) Patent No.: US 12,475,280 B2
(45) Date of Patent: Nov. 18, 2025

(54) GENERATIVE NETWORKS FOR PHYSICS BASED SIMULATIONS

(71) Applicant: ANSYS, INC., Canonsburg, PA (US)

(72) Inventor: Derek Christopher Hill, Grantham, NH (US)

(73) Assignee: ANSYS, INC., Canonsburg, PA (US)

( * ) Notice: Subject to any disclaimer, the term of this patent is extended or adjusted under 35 U.S.C. 154(b) by 778 days.

(21) Appl. No.: 16/827,037

(22) Filed: Mar. 23, 2020

(65) Prior Publication Data

US 2021/0295167 A1     Sep. 23, 2021

(51) Int. Cl.
| | |
|---|---|
| *G06F 30/27* | (2020.01) |
| *G06F 17/13* | (2006.01) |
| *G06F 18/21* | (2023.01) |
| *G06F 30/23* | (2020.01) |
| *G06N 3/084* | (2023.01) |
| *G06N 20/00* | (2019.01) |
| *G06V 10/764* | (2022.01) |
| *G06V 10/82* | (2022.01) |
| *G06F 111/10* | (2020.01) |

(52) U.S. Cl.
CPC ............. *G06F 30/27* (2020.01); *G06F 17/13* (2013.01); *G06F 18/217* (2023.01); *G06F 30/23* (2020.01); *G06N 3/084* (2013.01); *G06N 20/00* (2019.01); *G06V 10/764* (2022.01); *G06V 10/82* (2022.01); *G06F 2111/10* (2020.01)

(58) Field of Classification Search
CPC .......... G06F 30/27; G06F 30/23; G06F 17/13; G06F 2111/10; G06N 20/00; G06N 3/084; G06V 10/82; G06V 18/217

USPC ............................................................ 706/25
See application file for complete search history.

(56) References Cited

U.S. PATENT DOCUMENTS

| | | | |
|---|---|---|---|
| 2019/0251396 A1* | 8/2019 | Geraci | G06N 3/063 |
| 2020/0292608 A1* | 9/2020 | Yan | G05B 23/024 |
| 2020/0342325 A1* | 10/2020 | Lu | G06F 30/23 |
| 2020/0349393 A1* | 11/2020 | Zhong | G06N 3/084 |
| 2021/0034972 A1* | 2/2021 | Oh | G06N 3/08 |
| 2021/0148034 A1* | 5/2021 | Park | G06V 20/00 |

FOREIGN PATENT DOCUMENTS

| | | | | |
|---|---|---|---|---|
| WO | WO-2005052721 A2 * | 6/2005 | | A61N 5/1031 |

OTHER PUBLICATIONS

Rassi_2019 (Physics-informed neural networks: A deep learning framework for solving forward and inverse problems involving nonlinear partial differential equations (Year: 2019).*

(Continued)

*Primary Examiner* — Brian S Cook
(74) *Attorney, Agent, or Firm* — WOMBLE BOND DICKINSON (US) LLP

(57) ABSTRACT

Simulations of products during the design of the products can use solvers that are based on trained neural networks, and these solvers can provide results about the design of the product that can predict performance, failures, fatigue and other potential problems with the design. The neural network can include a generative neural network that is trained with a discretized version of a partial differential equation (PDE) that provides a model of the product in the simulation, and this discretized version acts as a discriminator that trains the neural network to provide solutions to the PDE.

19 Claims, 10 Drawing Sheets

(56) References Cited

OTHER PUBLICATIONS

Nash_2017 (Create Data from Random Noise with Generative Adversarial Networks, Nov. 14, 2017, Toltal) (Year: 2017).*

M. Raissi, P. Perdikaris, G.E. Karniadakis, "Physics-informed neural networks: A deep learning framework for solving forward and inverse problems involving nonlinear partial differential equations", Journal of Computational Physics 378, 2019, pp. 686-707.

J. Brezillon, R. Dwight, "Discrete Adjoint of the Navier-Stokes Equations for Aerodynamic Shape Optimization", Evolutionary and Deterministic Methods for Design, Optimization and Control with Applications to Industrial and Societal Problems, EUROGEN 2005, 12 pages.

Yann le Cun, "A Theoretical Framework for Back-Propagation", Proceedings of the 1988 Connectionist Models Summer School, pp. 21-28, CMU, Pittsburgh, PA, 1988.

* cited by examiner

GENERATIVE NETWORKS FOR PHYSICS BASED SIMULATIONS

BACKGROUND

Designers and manufacturers are increasingly using computer aided design (CAD) systems, such as computers that execute simulation software, to design products such as automobiles, airplanes, airplane engines, heating and cooling systems, etc. The use of such CAD systems allow the designers and manufacturers to test out different designs using the software without requiring that the design be built. For example, thermo-mechanical fatigue testing or thermal analysis of a proposed product, based on a design, can be performed on a simulated design of the product before the product is fabricated to determine when and how the product will fail. Similarly, a design of an airplane's wing, or other part, can be tested in the CAD system before the wing is fabricated to determine how well the wing will behave based on, for example, fluid flow of air around the wing while in flight. This testing by simulation can allow a designer to consider different possible designs and reject some of them based on the results of the simulation before the product is even fabricated. Moreover, results of one or more simulations can cause a designer to revise the design to improve its behavior or performance.

CAD systems often struggle to provide fast answers or simulation results because the computations required to produce the results are often enormous, and hence large and expensive computational processing resources may be required to achieve results in a useful timeframe. The simulations often require solutions to partial differential equations (PDE) that represent laws of physics or models of the physical systems being simulated. Solving these physics based PDEs normally requires large computation resources and lots of time for those resources to solve these equations.

SUMMARY OF THE DESCRIPTION

A neural network can be trained to provide valid solutions to a set of one or more partial differential equations (PDEs) that describe a model or law of physics which can be used to simulate a physical object in a simulation. The neural network can be trained by a discriminator that is based on a discretized version of the PDE. The neural network can be considered to be a variant of a generative adversarial neural network that is trained by using an already-trained discriminator that is the discretized version of the PDE. The discretized version of the PDE can be an algebraic representation in discrete numerical form of the PDE in a solution space. The discriminator can be used to train the neural network by discriminating between good and bad candidate solutions of the discrete PDE. The generated solution can be evaluated by the discriminator, and the results of the evaluation (in the form of one or more loss functions) can be used to adjust weights and biases in the neural network. After each training epoch, the weights and biases can be adjusted, and the candidate solution (for example, solution patches) can be input again and the process can be repeated while continuing to train the neural network. The regenerated solutions, after one or more epochs, can be used as new candidate solutions that are input into the neural network, and those new candidate solutions are improved solutions (for example, converging closer to true solutions) relative to the initial one or more candidate solutions (and the initial one or more candidate solutions are no longer used to train the neural network). The loss functions can be used to determine whether the neural network has been sufficiently trained to provide valid solutions to the PDE; for example, when the loss solutions indicate that the current net loss is within a threshold of a value (such as zero), then the system can determine that the neural network has been sufficiently trained and will provide valid solutions to the PDE.

After the neural network has been trained, it can be used in a system that simulates a physical object based upon the model or law of physics that the PDE provide solutions for. In one embodiment, the trained neural network can be part of the solver, such as an iterative solver, that can solve the PDE for a given simulation of a physical object in the simulation. A data processing system can store data representing the trained neural network that is part of the solver, and the data processing system can receive candidate solutions and use the trained neural network to provide actual solutions that can indicate one or more physical characteristics of the physical object in the simulation. The designer of the physical object can use the results of the simulation to decide whether or not the design of the physical object should be changed based upon the results to improve the physical object when it is fabricated.

In one embodiment, the model or law of physics can include, for example: Laplace's equation; or Navier-Stokes equations; or fluid flow models; or electromagnetic field models; or acoustic field models, or heat transfer models; or conservation of laws of physics models; or kinetic equations; or Burger's equation. In general, a PDE that describes a law of physics or a model, and particularly a PDE that describes or specifies field solutions in a field in space, can be used with the one or more embodiments described herein if the PDE can be expressed in a discretized version in which the PDE is expressed as an algebraic representation in discrete numerical form which sufficiently represents and provides accurate solutions of the PDE.

In one embodiment, the neural network includes two neural networks which are coupled together. In particular, the neural network can include an encoder neural network and a generator neural network. The combination of the encoder neural network and the generator neural network can be referred to as an autoencoder network. The generator neural network can be referred to as a generative neural network. The encoder neural network can include a first input to receive candidate solutions to the PDE during the training, and the generator neural network includes a second input which is coupled to an output of the encoder neural network. The first input of the encoder neural network is configured to receive, in one embodiment, a set of Q inputs during a training epoch that defines, for a first batch, candidate solutions in a solution patch for the PDE, and the encoder neural network produces N outputs based on the set of Q inputs; in one embodiment, the number of N outputs is less than the number of Q inputs. Thus the encoder neural network can reduce a dimensionality of the processing by encoding the Q inputs into N outputs, where N is less than Q. This encoding can, in effect, train the neural network to ignore signal noise. In one embodiment, the neural network can be considered an auto encoder type of neural network. In one embodiment, a batch of solution patches can be presented during the training as inputs to the encoder neural network, and the outputs from the neural network are regenerated solution patches that are evaluated by the discretized version of the PDE, and each batch is presented during a corresponding training epoch.

In one embodiment, a set of one or more loss functions can be a net loss function which is defined as a weighted sum of a neural network loss function and a PDE discretized loss function based on a discrete adjoint of the discretized version of the PDE. In one embodiment, during training, the system can determine, based on the net loss function, whether training can be stopped or should be continued. If it is to be continued, then the weights in the neural network can be updated, based on the loss function. In one embodiment, the discretized version of the PDE specifies solutions to one or more values, in the PDE, in each cell in a computational mesh of cells represented by the solution patch. In one embodiment, the solution specified by the discretized version of the PDE can be mapped through explicit steps into a residual field of residual values in a solution patch. In one embodiment, the updating of the weights can include a back propagation through the neural network, wherein the back propagation includes a back propagation through a discrete adjoint of the discretized version of the PDE.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in nonvolatile memory, such as flash memory, or dynamic random access memory (DRAM) which is volatile or other forms of memory.

The above summary does not include an exhaustive list of all embodiments that are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
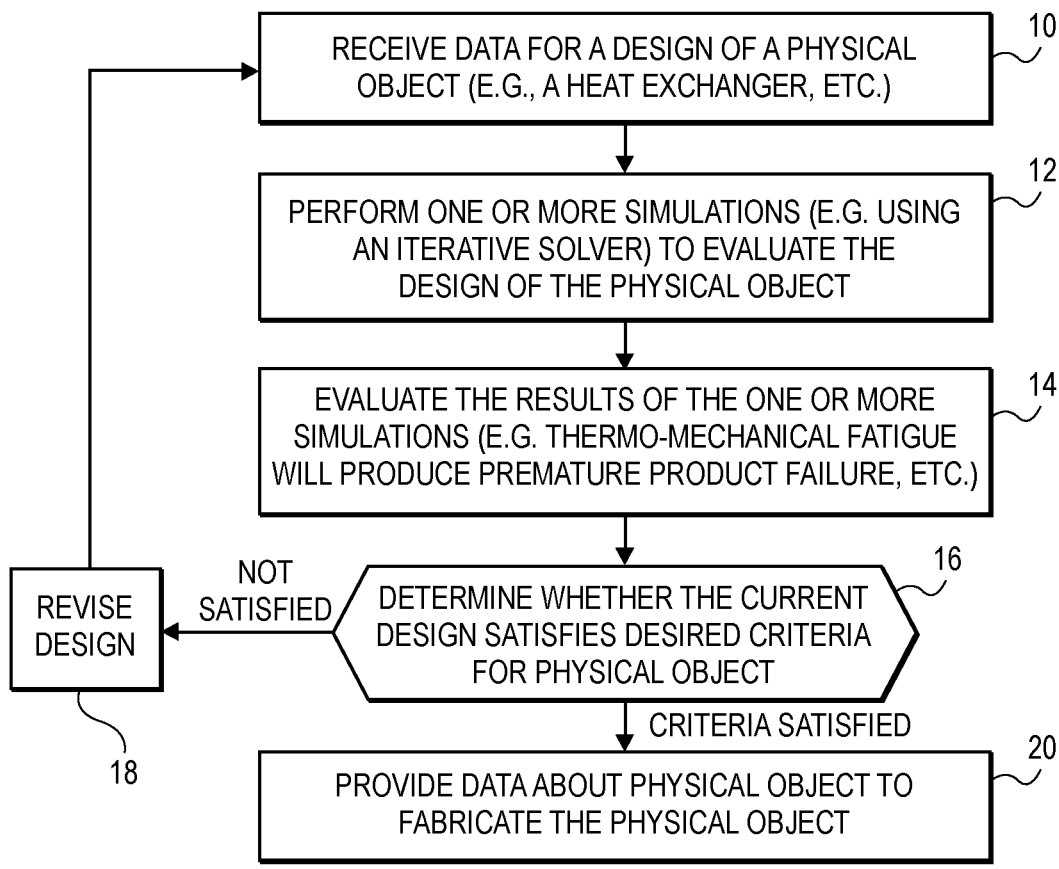
FIG. 1 is a flowchart which illustrates a method which can be used according to one or more embodiments described herein to design and fabricate a physical object such as an airplane wing.

The embodiments described herein can be used to train a neural network to provide solutions for models of a physical system, where the models are based on a set of one or more partial differential equations. These models can be used in simulations of physical objects and physical systems in order to determine whether a particular design of the physical object or physical system satisfies particular requirements for the object or system. For example, there might be certain design requirements for how an airplane wing should operate while the airplane is flying through a fluid such as air. Similarly, there may be certain design requirements for a heat exchanger which includes pipes and other components in the heat exchanger. FIG. 1 shows a method in which these design requirements can be tested relative to a particular design of a physical object or physical system which is being simulated. In operation 10 of FIG. 1, a data processing system can receive data about a design for a particular physical object. The data can be created in CAD software on a data processing system, and the data can include information about the materials used to fabricate the physical object as well as sizes of different parts of the physical object, the shape of the physical object, etc. Then in operation 12, the data processing system can perform one or more simulations to evaluate the design of the physical object. In one embodiment, the data processing system can perform simulations by using an iterative solver which converges upon a solution for the PDE that specifies parameters relative to the physical object in the simulation. For example, the airplane wing may be subjected to various different fluid flows during the simulation, and information from the simulation may indicate how well or poorly the particular design of the airplane wing performs, such as the amount of lift it can provide, etc. In operation 14, the designer can evaluate the results of one or more simulations to determine whether the design of the physical object satisfies certain desired criteria for the physical object. For example, the designer can determine whether the expected failure rate or product lifecycle indicated in the simulation's results satisfy desired criteria for the physical object. This determination is shown in operation 16. If the criteria is satisfied, then the designer in operation 20 can provide data about the physical object to allow the fabrication or manufacture of the physical object. For example, if the criteria is satisfied, a CAD file can be produced that describes how to build the physical object such as an airplane wing. If the criteria are not satisfied as determined in operation 16, the designer can revise the design in operation 18 (for example, by changing sizes or shapes of parts in the physical object or changing the composition of material(s) in the object, etc.) and repeat the process by performing additional further simulations to evaluate the redesigned physical object. This can be repeated until the desired criteria are achieved for the physical object, and may require the designer change the design in terms of the materials used and other parameters that describe how the physical object will be fabricated or otherwise produced. The simulations performed in operation 12 can use a trained neural network as described herein to provide the simulations which are based upon solutions to PDEs as described herein.

Figure 2A:
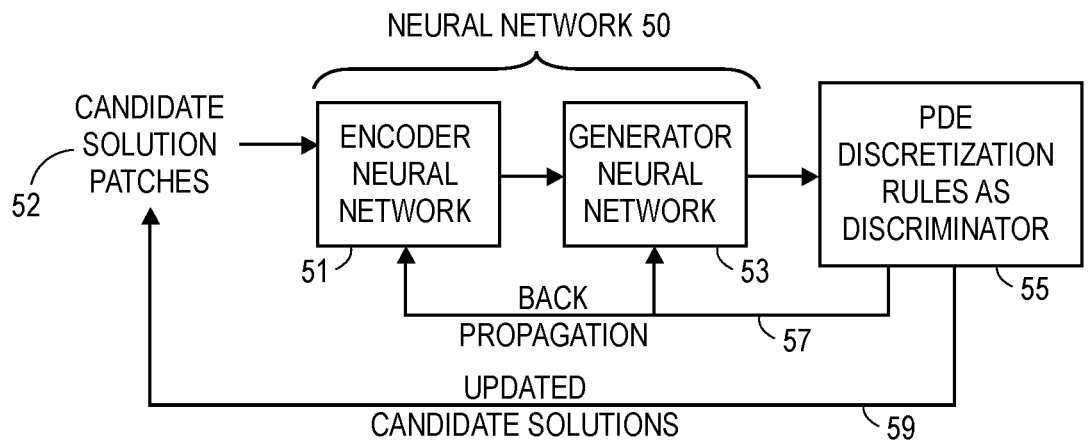
FIG. 2A shows an example of a system for training a neural network according to one or more embodiments described herein.

FIG. 2A shows an example of a system for training a neural network to provide solutions to a PDE. It will be appreciated that the neural network can be trained on a data processing system such as a computer that includes a processing system and memory that stores software that can define a neural network in memory of the data processing system. Further, the memory can store data about the neural network, such as the configuration of the neural network and the weights and biases used within the neural network. In the example shown in FIG. 2A, the neural network 50 includes an encoder neural network 51 and a generator neural network 53. The encoder neural network 51 includes an input layer which receives candidate solution patches 52, and the encoder neural network 51 provides an output which is an input to the generator neural network 53. The output from the generator neural network 53 is provided to a discriminator 55 which is in the form of a discretization of a PDE which specifies rules for values in solution patches that satisfy valid solutions for the PDE. In one embodiment, the discretization of the PDE can be an algebraic representation in discrete numerical form of the PDE, where the algebraic representation can provide valid solutions for the PDE within a solution space such as a solution patch. The solution space can represent a physical space such as a three dimensional space, and the PDE can describe or specify values of physical parameters within the three dimensional space; for example, the physical parameters can be parameters representing vectors or scalars that describe physical fields such as electromagnetic fields, acoustic fields, etc. The discriminator 55 can be used to determine one or more loss functions which can then be used to calculate updated weights and biases which are backed propagated in back propagation 57 to update the weights and biases of the encoder neural network 51 and the generator neural network 53. The neural network 50 can be trained repeatedly over time in separate epochs. In each epoch, a solution patch is applied as an input to the encoder neural network 51 which provides an output to the generator neural network 53 which receives that output and which provides an output of a candidate solution to the discriminator 55, and the discriminator 55 can be used to compute one or more loss functions which in turn can be used in the back propagation 57 to update the weights and biases in the encoder neural network 51 and the generator neural network 53. In one embodiment, the updated candidate solutions at some point can be used to replace the initial candidate solution patches 52 with the updated candidate solutions which were obtained as an output from the generator neural network 53. In one embodiment, several training epochs may be performed before replacing the initial candidate solution patches 52 with the updated candidate solutions 59. This process of replacing the candidate solution patches can be performed repeatedly; for example, after every three or after every five training epochs, the updated candidate solutions provided as an output from the generator neural network can be used to replace the previously used candidate solution patches. This replacement of previously used candidate solution patches improves upon solutions provided by the generator neural network.

Figure 2B:
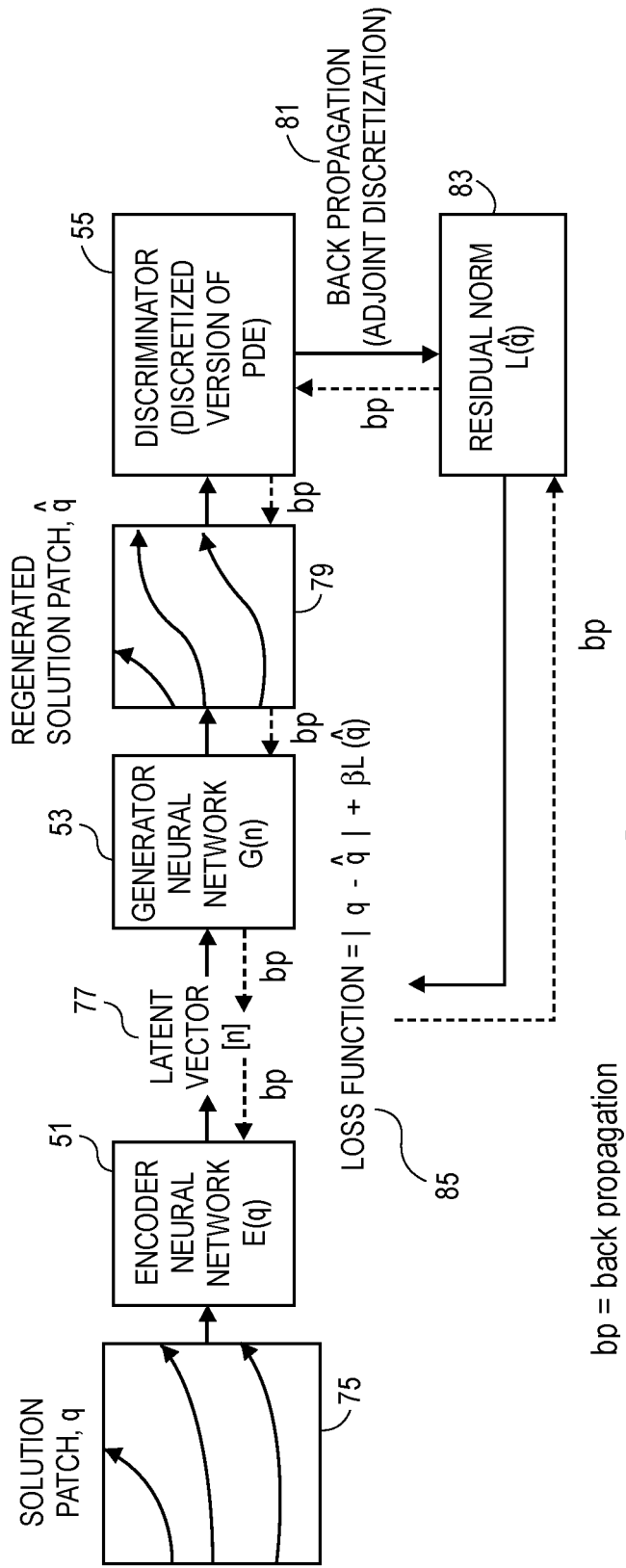
FIG. 2B shows another example of a system for training a neural network according to one or more embodiments described herein.

FIG. 2B shows another example of a system that can train a neural network using PDE discretizations. In the example shown in FIG. 2B, the encoder neural network 51 provides a latent vector 77 that can have a reduced dimension relative to the plurality of inputs from the solution patch 75. The solution patch 75 can represent values in a field in space, such as three dimensional space; for example, these values can represent values for electric potential, or temperature, or gravitational potential in a field, or fluid flow values such as fluid velocity, fluid pressure, and other values known in the art and used in PDE's that model or describe physical laws and can be used in simulations. In one embodiment, the solution patch 75 can provide Q inputs to the encoder neural network 51 which provides N outputs based upon the Q inputs, where the number of Q inputs is greater than the number of N outputs; for example, there may be 20 Q inputs which produce 10 N outputs for a given solution patch which was inputted into the encoder neural network 51. This represents a dimension reduction in the process, and the encoder neural network can be trained to ignore signal noise so that the most salient input features are captured and recognized and provided in the form of the latent vector 77. The latent vector 77 is used or applied as an input to the generator neural network 53 which provides a regenerated solution patch 79 as shown in FIG. 2B. The regenerated solution patch 79 represents a regeneration of a solution patch, and this regenerated solution patch more accurately reflects a valid solution then the solution patch 75, particularly after several training epochs of the neural network. The regenerated solution patch can be provided as an input to the discriminator 55 which can be a discretization of the PDE which is being solved. Through a process of adjoint discretization and back propagation 81, a residual norm 83 can be computed and used in a loss function 85 which in turn can be used to update the weights and biases within the encoder neural network 51 and the generator neural network 53 through the back propagation paths (labelled with the label "bp") shown in FIG. 2B. Multiple training epochs can be used for each solution patch, and a solution patch can be replaced with an updated solution patch provided as an output by the generator neural network 53; for example, a previously used solution patch can be used for one or more training epochs and then replaced with an updated or regenerated solution patch which can then be used for subsequent one or more training epochs to continue to train the neural network. The loss function 85 shown in FIG. 2B is one example of a loss function which can be used to compute the weights and biases within the two neural networks 51 and 53 shown in FIG. 2B. The residual norm 83 can be computed from the discretization of the PDE which embodies the discriminator 55. Further details regarding the discriminator 55 and the residual norm 83 and the loss function 85 are provided further below.

Once the neural network has been trained, it can be used in a solver to provide simulation results for one or more simulations of a physical object or a physical system containing more than one physical object. The solver can be part of a general purpose simulation software that can receive CAD files describing the design of a product and can perform one or more simulations of the product in the design to allow designers to evaluate the design and determine whether the current design is satisfactory. For example, the solver shown in FIG. 3 can be used in the method shown in FIG. 1 to provide simulation results which can be evaluated in order to achieve a design that satisfies desired criteria. In the example shown in FIG. 3, a solver 101 can be an iterative solver that uses a series of approximate solution value(s) to converge to a solution that is sufficiently close based upon a threshold value. The solver 101 can include the trained neural network 105 that includes an encoder neural network (NN) 107 and a generator neural network 109. The encoder neural network 107 can be similar to the encoder neural network 51 in FIG. 2A after the encoder NN 51 has been trained, and the generator neural network 109 can be similar to the generator neural network 53 in FIG. 2A after the NN 53 has been trained. The trained neural network 105 can receive initial candidate solutions 103 (which can be random or values based on information about the design) and can generate candidate solutions as outputs from the generator NN 109. The convergence tester 111 can receive those outputs and test them for convergence to a solution using known solution convergence techniques to determine, in operation 113, whether a converged solution has been obtained. The test for convergence can seek to determine whether an error level related to a solution exceeds a threshold value; if it does, then the solution has not yet converged and operation 113 causes the system to repeat the solution process by using the update candidate solution 117 from the last output of the generator NN 109 as the next input to the encoder NN 107 to repeat the process during the iterative solution process performed by the solver 101. If the convergence tester determines in operation 113 that the solver has converged to a satisfactory solution, the processing can proceed to operation 115; in operation 115, the solution results from the solver can be presented (e.g., displayed) to a designer who can then decide whether to continue the simulations (e.g., because the results are less than satisfactory) or end the simulations because the results provide satisfactory results for the simulated product. While FIG. 3 shows a particular architecture for a neural network, it will be appreciated that other architectures can be used in the one or more embodiments described herein while still using a NN that was trained by using a discretized version of a PDE.

Figure 4:
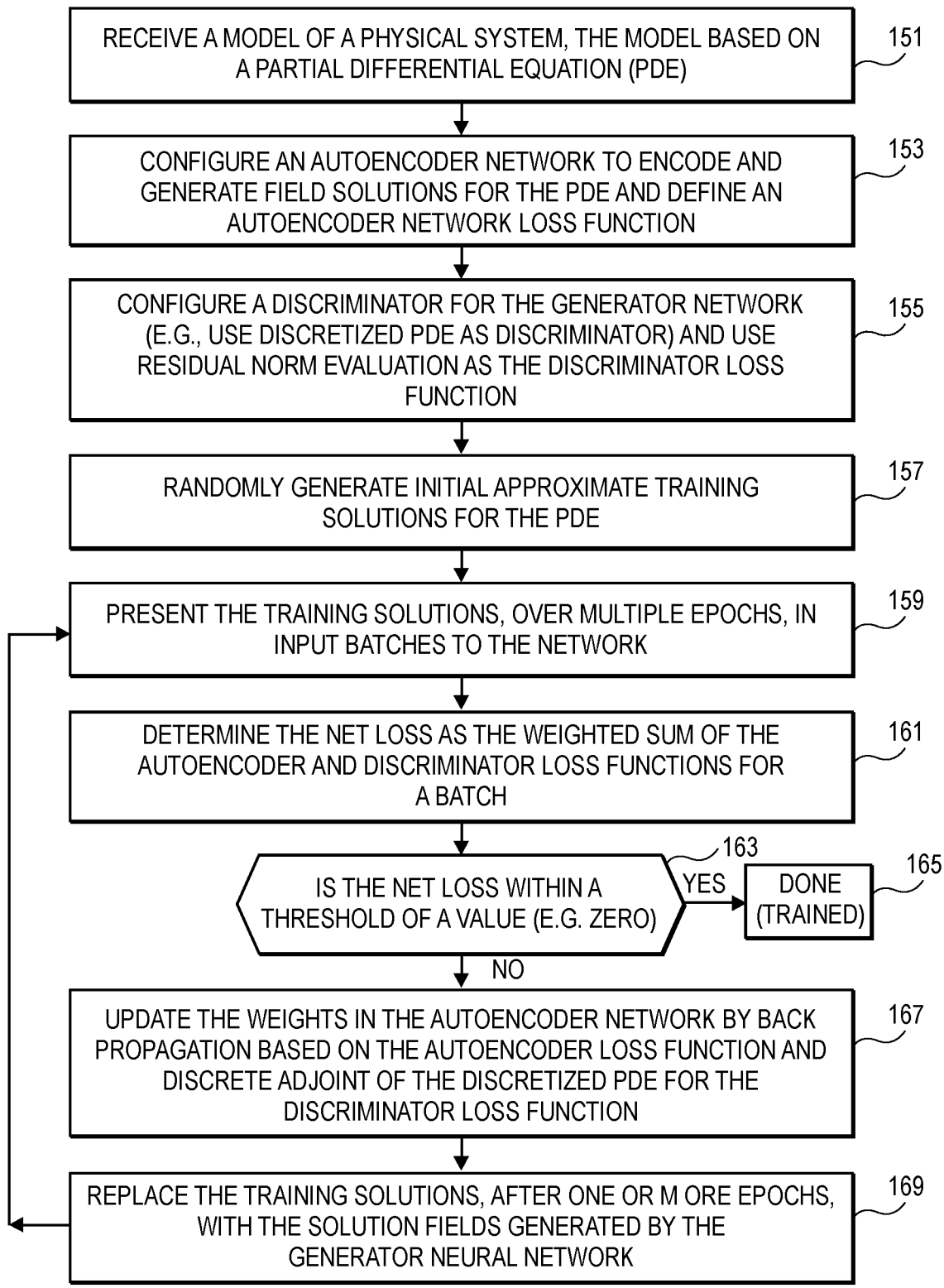
FIG. 4 shows a flowchart which describes a method for training a neural network according to one or more embodiments described herein.

Further details regarding the training of a neural network will now be provided while referring to FIG. 4 which shows a method for training a neural network according to one embodiment. In operation 151, a data processing system (e.g., a computer system with a general purpose physics based simulation software, such as multi-physics engineering software from ANSYS Inc. of Canonsburg, PA) can receive data about a model of a physical system, where the model can be based on a partial differential equation (PDE). For example, in the case of fluid flow simulations, the model can be based on the Navier-Stokes equations for incompressible viscous fluid flow. In operation 153, the user or the system can configure an autoencoder network (e.g., a neural network such as the NN 50 in FIG. 2A) to encode and generate field solutions (e.g., electromagnetic field values based on the Laplace equation) for a PDE; and operation 153 can include a process for defining an autoencoder loss function that can be used when training the neural network. In one embodiment, operation 153 can include a series of operations in which a neural network is configured, and these operations can include selecting the number of layers and neurons in the neural networks and selecting the activation function types for the neural networks as well as selecting solution field data and a latent vector dimension based on an expected or desired compression ratio (e.g., from Q inputs into the encoder neural network to N outputs from the encoder neural network). Further information about a particular implementation of operation 153 is provided further below in conjunction with the method shown in FIG. 5A. Referring back to FIG. 4, in one embodiment operation 155 can include configuring a discriminator for the generator neural network and configuring a discriminator loss function which can be based upon a residual norm calculation. In one embodiment, the discriminator can use a discretized version of the PDE which is being solved by the neural network, and once the discriminator is configured it can be the discriminator 55 shown in FIGS. 2A and 2B. Further information about a particular implementation of operation 155 is provided below in conjunction with the method shown in FIG. 5B. Referring back to FIG. 4, after the auto encoder network has been configured and after the discriminator has been configured, training can begin in operation 157 by randomly generating, in one embodiment, initial approximate training solutions for the PDE. In operation 159, these randomly generated initial approximate training solutions can then be presented, over one or more epochs, as input batches to the neural network. In one embodiment, these input batches are applied as inputs to the encoder neural network, such as the encoder neural network 51 shown in FIGS. 2A and 2B. These input batches produce outputs from the encoder neural network which are applied as inputs to the generator neural network which provides outputs in the form of candidate solutions which are then processed in operation 161. In operation 161, the system determines a net loss, in one embodiment, as a weighted sum of the auto encoder loss function and the discriminator loss function for a particular batch. This loss function is then evaluated in operation 163 by comparing the net loss to a value, such as zero, to determine whether or not the net loss is sufficiently close to the value such that training has been completed. If the net loss is in fact within a threshold value of zero in one embodiment, the system can conclude that training has been completed (as shown in operation 165 of FIG. 4) as the neural network has provided sufficiently accurate solutions to the PDE. On the other hand, if the net loss exceeds the value by more than a threshold of desired error then processing proceeds to operation 167 in order to update the weights and biases in the neural network such as the neural network 50 shown in FIGS. 2A and 2B. In operation 167, the system updates the weights and biases using a back propagation process which can be based on the auto encoder loss function and the discrete adjoint of the discretized PDE for the discriminator loss function. Further information about a particular implementation of operation 167 is provided below in conjunction with the method shown in FIG. 5C. After the weights and biases in the neural network have been updated by operation 167, processing can revert back to operation 159 as shown in FIG. 4. In one embodiment, before reverting back to operation 159, the system can replace the training solutions from operation 157 with the most recent candidate solution fields which have been generated by the generator neural network. This replacing of the training solutions is shown as operation 169. In one embodiment, multiple training epochs can be used for a set of input batches before a new set of candidate solutions is used to replace the previously used candidate solutions (which were the input batches that were previously used during the training session). The method shown in FIG. 4 can repeat through operations 159, 161, 163, 167, and 169 until the net loss value is evaluated to be close enough to the value, such as zero, to indicate that the neural network has been trained to provide sufficiently accurate solutions to the PDE.

Figure 3:
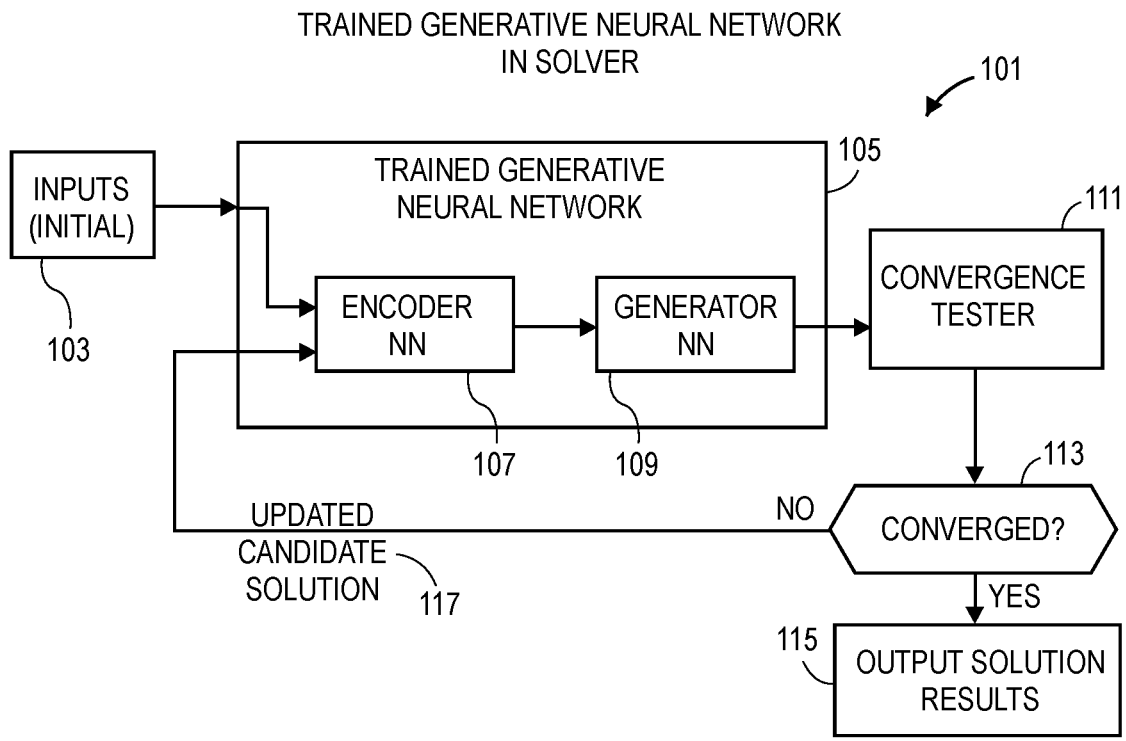
FIG. 3 shows an example of a system that can use a trained neural network in a solver according to one or more embodiments described herein.

The method shown in FIG. 4 can be used with the neural network shown in FIGS. 2A and 2B to train the neural network to provide solutions to a particular PDE, and once the neural network has been trained, it can be used in a solver, such as the solver shown in FIG. 3.

Figure 5A:
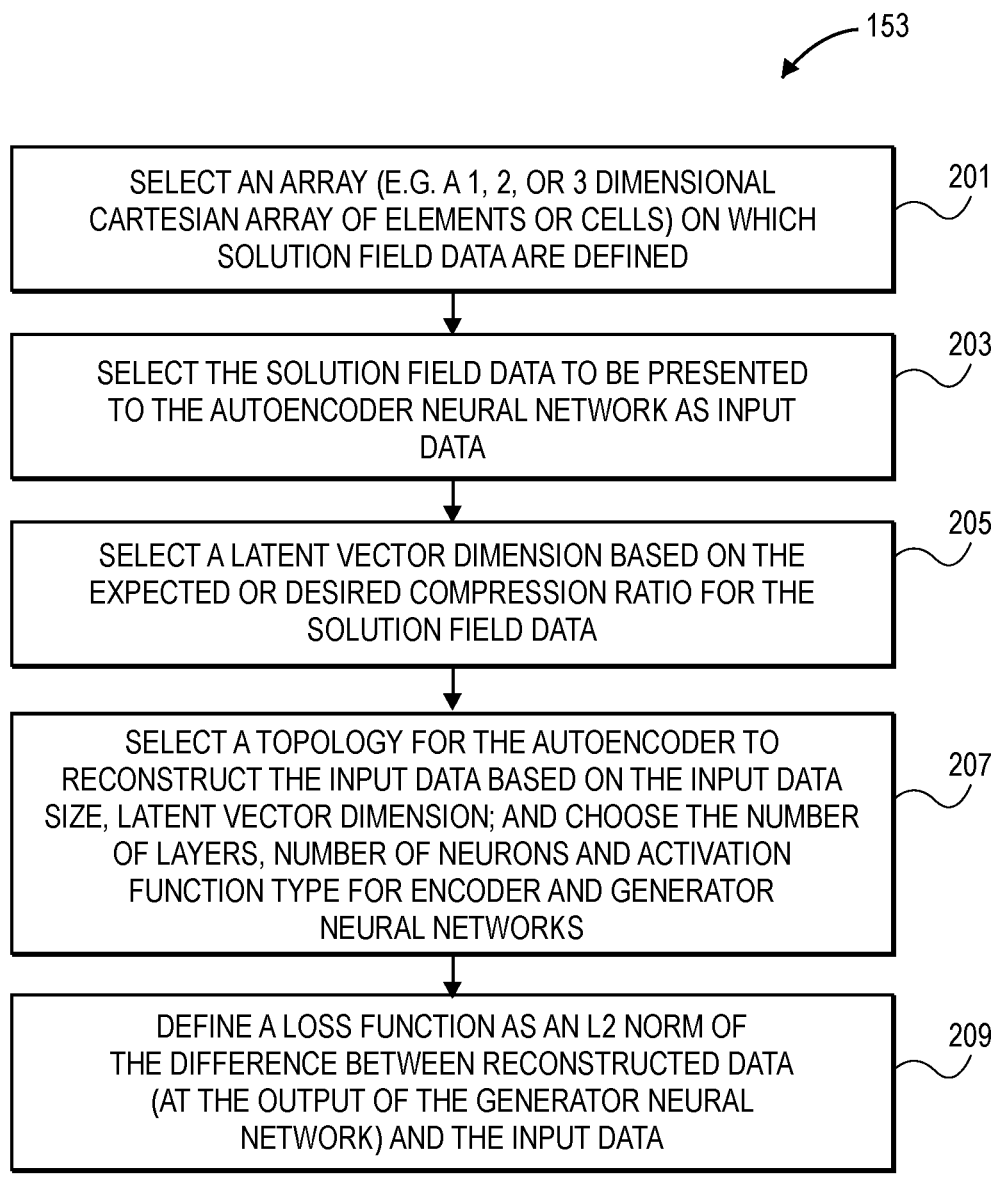
FIG. 5A shows a flowchart which illustrates a set of operations which can be performed as part of the method shown in FIG. 4.

FIG. 5A shows an example of an implementation of operation 153 from FIG. 4. This implementation can create a particular neural network based upon the selections made in the method shown in FIG. 5A. In operation 201, the designer of the neural network selects the dimension of the array on which elements or cells will be placed. The size of the array of cells that will form the solution patch is chosen in operation 201. This size is normally a portion of a possible solution space and can be 4×4 or 8×8, or 32×32, etc. in the case of a 2D array. For example, in the case of a solution field for electromagnetic fields, the array will typically be a 3D (3 dimensional) Cartesian array of elements or cells that can be used to form a computational mesh for solving for electromagnetic field values in the mesh; the field values across several cells of the mesh represent the varying field values in space of an electromagnetic field (such as E for electrical potential). In operation 203, the designer of the neural network selects the solution field data (e.g., a set of data for a solution patch) to be presented to the autoencoder neural network (e.g., the neural network 50 in FIG. 2A); this selection may initially be random but constrained to be within a portion of the possible solution space such that within a solution patch the values are constrained to be limited to a contiguous set of values in only a portion of the possible solution space (e.g., values for velocity of fluid flow are constrained to be within a limited range of possible values in the solution patch). The solution field data can be defined on each element or cell of the solution patch and may have multiple components on each element or cell (e.g., velocity vector and pressure in the case of a Navier-Stokes PDE). In operation 205, the designer of the neural network selects the dimension of the latent vector (e.g., the latent vector 77 in FIG. 2B); this selection can be based on the expected or desired compression ratio for the solution field data. More compression (or dimensional reduction) may improve the rejection of "noise" by forcing the neural network to be trained on a more compressed ratio. The ratio of compression is the ratio of the Q inputs (applied to the encoder neural network) to the N outputs (from the encoder neural network) in the case of the neural network shown in FIG. 2B; this ratio will typically be greater than 1.0 and may be significantly higher (such as 1.5 or 2.0). In operation 207, the designer of the neural network selects a topology for the neural network. The selection of the dimension of the latent vector will define the number of neurons in the output layer of the encoder neural network and the number of neurons in the input layer of the generator neural network. The selections in operation 207 define the input layer of the encoder neural network (based on the input data for a field solution of the PDE being solved), and these selections also define other topology parameters for the neural network including the number of layers (e.g., the number of hidden layers within each neural network in the neural network) and the number of neurons within each layer (e.g., the number of neurons in each hidden layer) and the type of activation functions used in the neurons in both neural networks). In one embodiment, the encoder neural network and the generator neural network can be convolutional neural networks in at least some of their layers. In operation 207, the particular neural network configured by the method shown in FIG. 5A can be tailored to the type of PDE to be solved and the domain of the solution; for example, the choice of the network topology and the length of the latent vector (such as the latent vector 77 in FIG. 2B) can be tailored to the type of PDE being solved by the neural network For Laplace's equation in two dimensions the solution, ¢, can be expressed in polar coordinates $$(r, \theta) \text{ as } \phi(r, \theta) = \sum_{n=0}^{N} a_n r^n \cos n\theta + \sum_{n=1}^{N} b_n r^n \sin n\theta$$

for some coefficients $a_n$, n=0, ..., N, $b_n$, n=1, ..., N. These 2N+1 coefficients can describe the homogeneous solutions on a region of space where the solution can be evaluated on a uniform array of M by M points. The value of M imposes an upper limit on N, since a value of N that is too large leads to unresolved solutions (like a Nyquist limit). The minimum resolvable angle is 2/M and the maximum rate of angular variation between grid points must not exceed π/4N. This approach determines the appropriate dimension of the latent space (2N+1) and it is dependent on the particular PDE under consideration and the resolution of the grid on which it is discretized. A classical linear PDE such as Laplace's equation is amenable to this type of analysis. A nonlinear set of equations such as the Navier Stokes equations, while not accessible to analysis to the same extent, will follow a similar pattern. The topology of the encoder and generator networks is expected to have a deep convolutional form typically. This is a consequence of the self-similar local structure of the PDE solutions. However, the is no strict obligation to adopt such a convolutional topology. In operation 209, the designer of the neural network defines the loss function, in one embodiment, as an L2 norm of the difference between the reconstructed data (at the output of the generator neural network) and the input data. In other embodiments, other loss functions can be used.

Figure 5B:
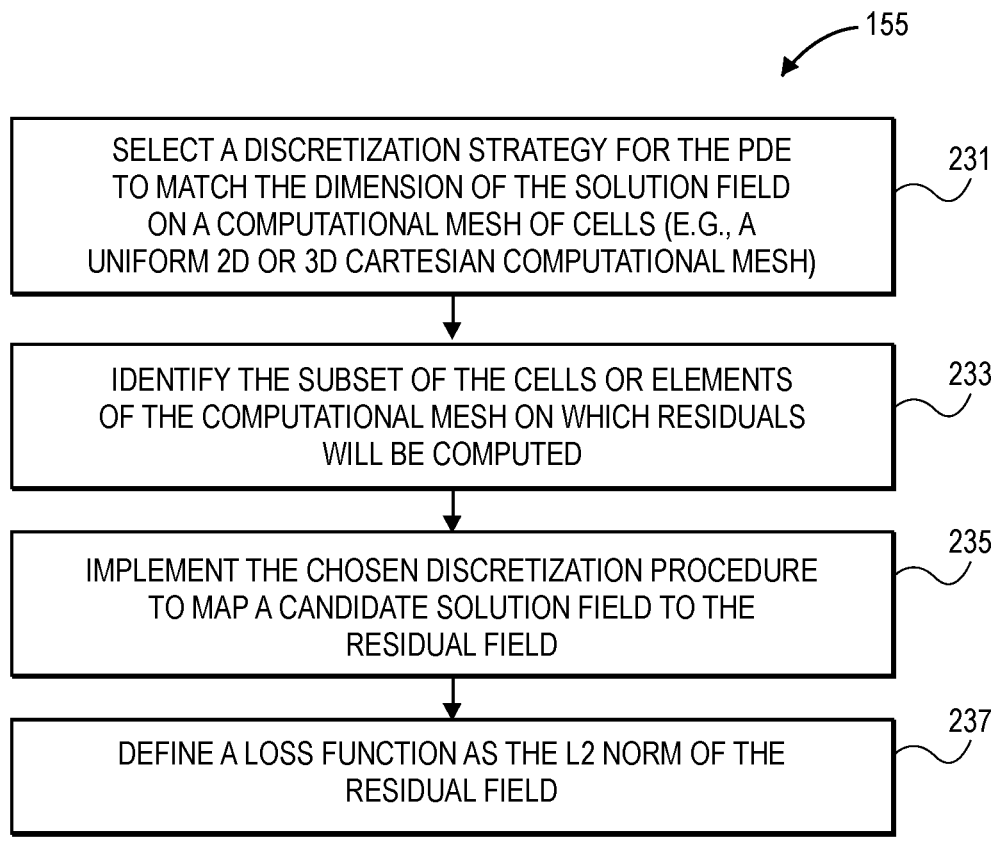
FIG. 5B shows a flowchart which illustrates a set of operations which can be performed as part of the method shown in FIG. 4.
Figure 6A:
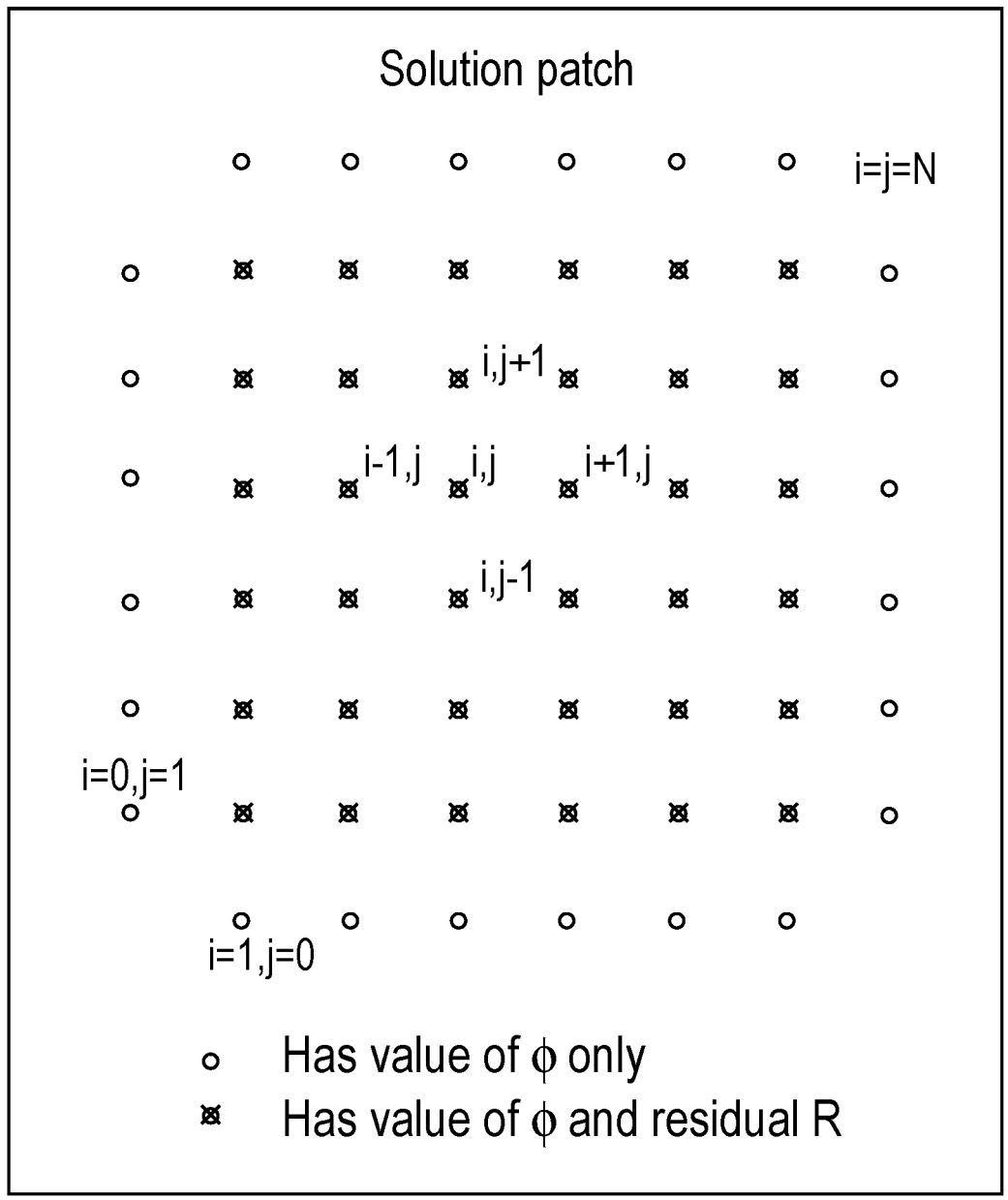
FIG. 6A shows an example of a solution patch which can be used to train a neural network for a particular type of PDE (e.g., Laplace's equation) according to one embodiment.
Figure 7:
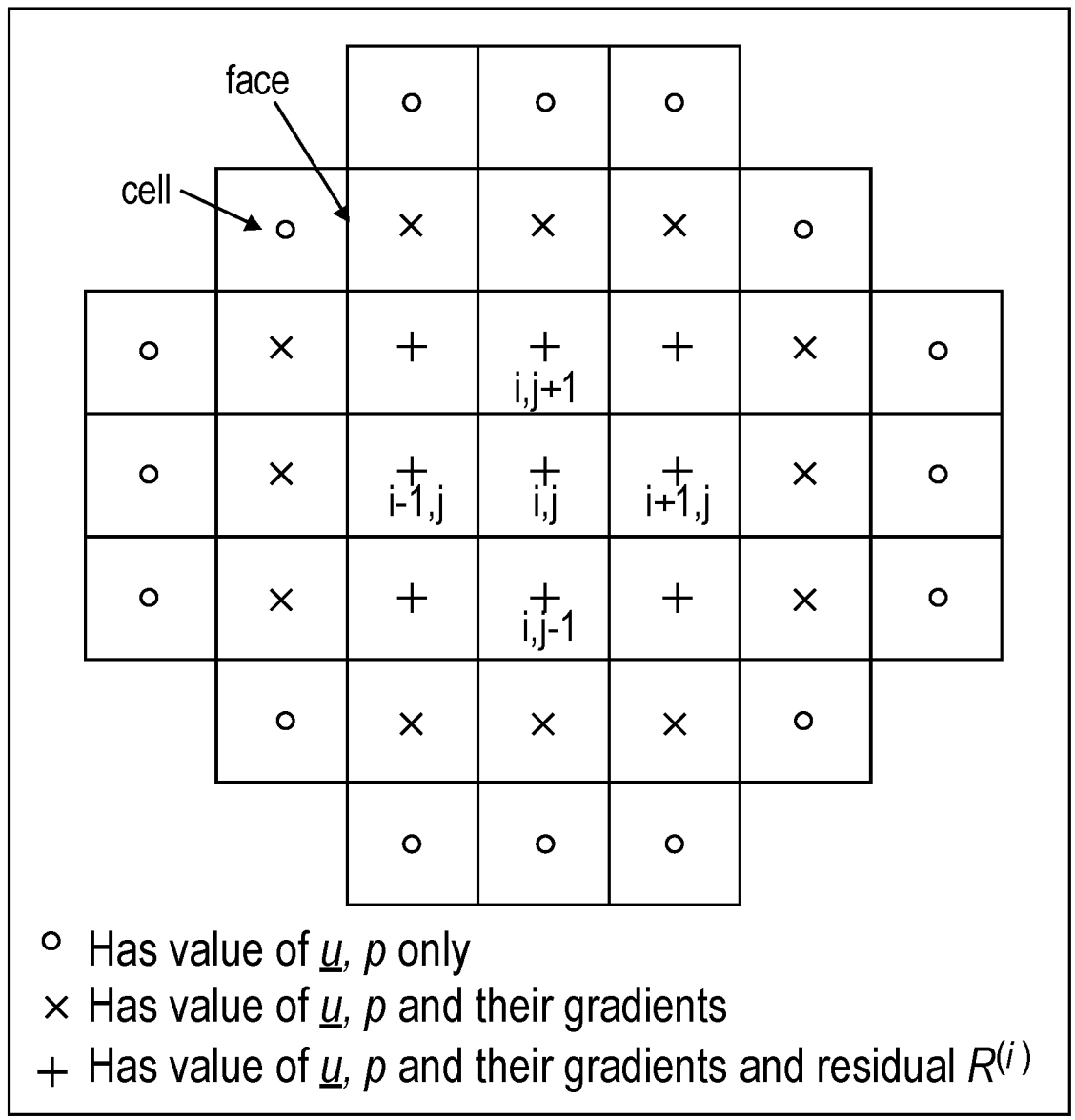
FIG. 7 shows another example of a solution patch which can be used to train a neural network for another type of PDE according to one embodiment.

FIG. 5B shows an example of an implementation of operation 155 from FIG. 4. This implementation can create a particular discriminator for a particular PDE that can be solved by the neural network, and the discriminator created by this implementation can be the discriminator 55 in FIG. 2B. In operation 231, the designer of the neural network that uses the discriminator selects a discretization strategy for the PDE to match the dimension of the solution field on a computational mesh of cells (a 3D Cartesian computational mesh). There are many possible strategies for discretizing PDEs, and such procedures for discretizing PDEs are known in the art of computational sciences. The discretization strategy should be selected so that a solution field can be mapped through explicit steps into a residual field during the discretization process. In operation 233, the designer identifies the subset of the cells or elements of the computational mesh on which residuals will be computed; FIGS. 6A and 7 show examples of how the subset can be defined for two different PDEs. In operation 235, the chosen discretization procedure is implemented to map a candidate solution field to the residual field. The discretization of the PDE can be performed in many ways. Classes of approach include, but are not limited to, finite difference, finite element, discontinuous Galerkin, and finite volume procedures. The discretization process for all of these classes of approach leads to a set of algebraic equations that are satisfied when the candidate solution represents a discrete approximation to the solution of the PDE. The residual field quantifies the degree to which these algebraic conditions are not satisfied should the field that is presented not be a solution to the discretized PDE. A sequence of arithmetic operations, sometimes rich and intricate, is performed on the entries of the candidate solution field that eventually results in a residual field. These discretization procedures are a known art for practitioners of the computational sciences. In operation 237, a loss function for the discriminator is defined, in one embodiment, as the L2 norm of the residual field. A residual field of zero corresponds to the input field being a discrete approximation to a solution of the PDE in one embodiment. An example of a residual loss function for a discriminator for a Laplace PDE is provided below.

Figure 5C:
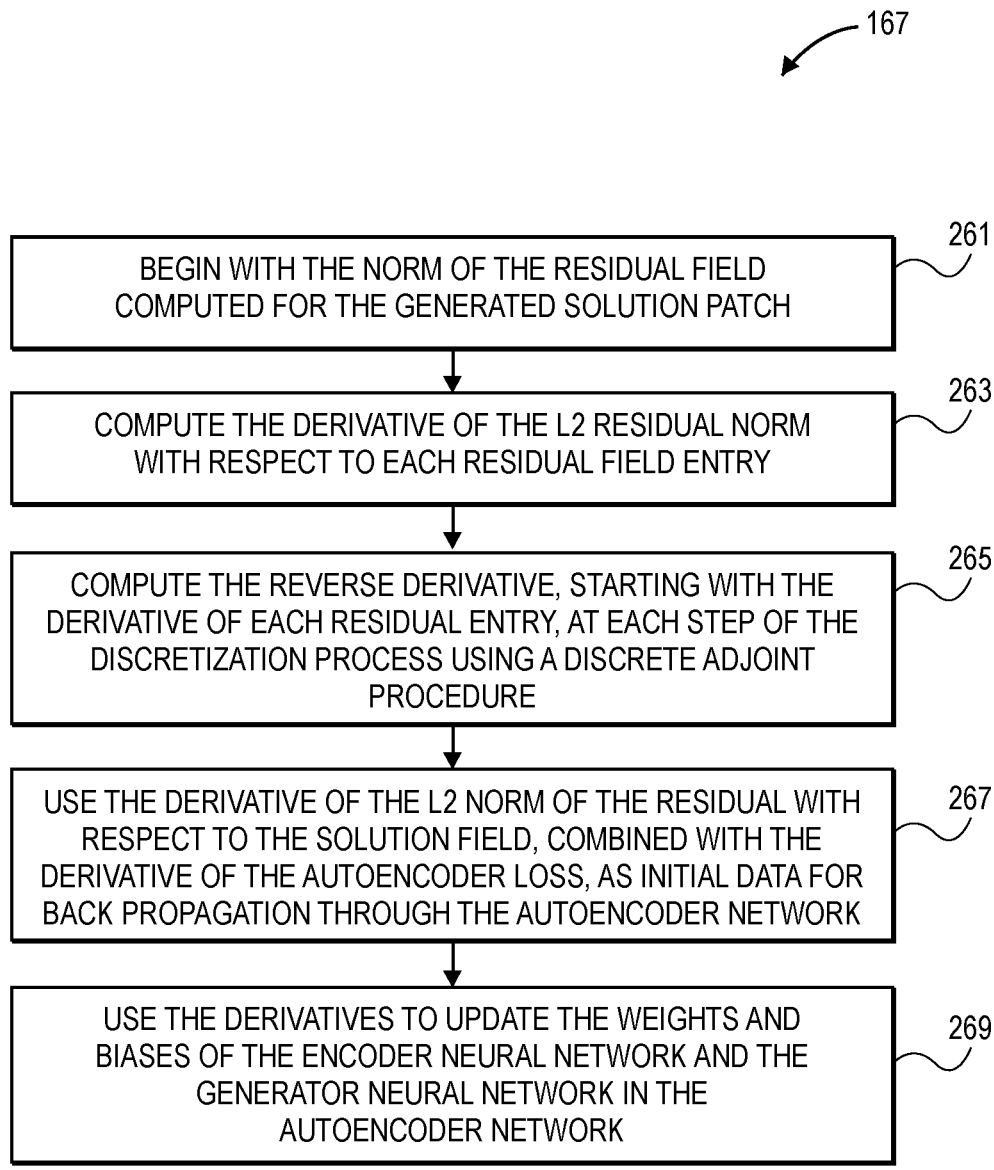
FIG. 5C shows a flowchart which illustrates a set of operations which can be performed as part of the method shown in FIG. 4.

FIG. 5C shows an example of an implementation of operation 167 in FIG. 4. This implementation can be used to compute the updated weights and biases in the neural network based on the loss functions defined previously (the neural network loss function and the discriminator loss function), and these updated weights and biases are used in the back propagation process to train the neural networks. The back propagation process through the neural network can use techniques known in the art for this back propagation process (e.g., by using known native methods that are implemented in existing machine learning tool kits). Back propagation through the discretization can be achieved by using a discrete adjoint approach (which is a reverse form of the chain rule for differentiation used in calculus). In operation 261, the norm of the residual field is computed for the generated solution patch. In operation 263, the derivative of the L2 residual norm with respect to each residual field entry is computed. In operation 265, the training system computes the reverse derivative, starting with the derivative of each residual entry, at each step of the discretization process using the discrete adjoint procedure. In operation 267, the training system uses the derivative of the L2 norm of the residual with respect to the solution field, combined with the derivative of the loss function for the neural network, as initial data for back propagation through the neural network. Then in operation 269, the training system uses the derivatives to update the weights and biases of the encoder neural network and the generator neural network. Once the weights and biases are updated, the next training epoch can begin and the entire process can repeat.

Examples of Discretizations and their Discrete Adjoint

The following section will provide examples of discretizations of PDEs and their discrete adjoint. The first example is for Laplace's equation, which is the governing equation for: incompressible inviscid fluid flow; electric field potential (e.g., $\phi=E$); temperature field in equilibrium (e.g., $\phi$=temperature); and gravitational potential field. Laplace's equation can be expressed in the following form of a partial differential equation:

$$\frac{\partial^2 \phi}{\partial x^2} + \frac{\partial^2 \phi}{\partial y^2} = 0$$

A residual for this PDE can be discretized on a uniform unit-spaced Cartesian mesh into the following finite difference discrete numerical form:

$$R_{i,j} = \phi_{i+1,j} + \phi_{i-1,j} + \phi_{i,j+1} + \phi_{i,j-1} - 4\phi_{i,j}$$

where i and j indicate indeces of points in the x and y directions respectively. In this first example, the x and y coordinates are positions in physical space and may be considered to be, or referred to be, independent variables, and these independent variables are variables to which derivatives are being taken as shown in the one or more equations. Also in this first example, the variable $\phi$ is being solved for and is being differentiated in the PDE relative to the positions in physical space (e.g., in x and y) and this variable may be referred to as a dependent variable; data from solutions of this variable may be referred to as solution field data since it is defined over a portion of space (such as a patch in space). The PDE in this example enforces or describes a constraint on the relationship between the dependent variables (e.g., $\phi$ in this example) and their derivatives over physical space. There are, in many situations, multiple possible dependent variable values (e.g., different solutions of $\phi$ in this example over a portion of space) that can satisfy the PDE. This collection of possible solutions can be referred to as a solution space. A trained neural network can, in one embodiment, generate any and all solutions in this space. An imposition of boundary conditions can constrain the space of possible solutions. The goal of a typical solver is to identify one particular solution that satisfies some particular set of boundary conditions.

FIG. 6A shows a solution patch for the Laplace PDE and also shows the spatial relationship of the residuals in each cell, such as the residual $R_{i,j}$ at the cell i,j near the middle of the solution patch and the residual $R_{i+1,j}$ at the cell i+1,j in the solution patch. The cells at the border of the solution patch in FIG. 6A each have only a value of $\phi$, and all other cells in the solution patch each have a value of $\phi$ and a residual value R. In this example for the Laplace PDE, the residual loss function can be defined as:

$$L(\phi) = \frac{1}{2} \sum_{i=1}^{N-1} \sum_{j=1}^{N-1} R_{i,j}^2$$

The derivative of loss with respect to values of $\phi$ can be expressed as:

$$\delta L = \sum_{i=1}^{N-1} \sum_{j=1}^{N-1} R_{i,j} \delta R_{i,j}$$
$$= \sum_{i=1}^{N-1} \sum_{j=1}^{N-1} R_{i,j} (\delta \phi_{i+1,j} + \delta \phi_{i-1,j} + \delta \phi_{i,j+1} + \delta \phi_{i,j-1} - 4\delta \phi_{i,j})$$
$$= \sum_{i=0}^{N} \sum_{j=0}^{N} D_{i,j} \delta \phi_{i,j}$$

These derivatives $D_{i,j}$ can, in one embodiment, be presented directly as input for the back propagation process in the generation neural network (such as the back propagation 57 in FIG. 2A).

The second example is for the Navier-Stokes equations, which are the governing equations for incompressible viscous fluid flow in two dimensions. The Navier-Stokes equations can be expressed in the following form:

$$R_k(x) = \begin{cases} \dfrac{\partial}{\partial x_\ell}(\varrho u_k u_\ell) - \mu \dfrac{\partial^2 u_k}{\partial x_\ell^2} + \dfrac{\partial p}{\partial x_k}, & k = 0, 1 \text{(momentum)} \\ \dfrac{\partial}{\partial x_\ell}(\varrho u_\ell), & k = 2 \text{(mass)} \end{cases}$$

In this equation, fluid velocity is u, pressure is p, constant fluid density is Q and constant viscosity is μ. In one embodiment, a discrete numerical procedure for the Navier-Stokes equations can include the following operations on the velocity components $u_k^{i,j}$ and pressure $p^{i,j}$ at the locations indexed by i, and j, as shown in FIG. 7: (1) compute velocity and pressure gradients using Green-Gauss accumulation based on neighboring data through faces in the computational mesh (see solution patch in FIG. 7 which shows the mesh for this Navier-Stokes procedure); (2) compute mass fluxes through faces by averaging adjacent cell velocities; (3) add mass flux contribution for each face to each adjacent cell; (4) compute convective flux at each face by upwinding (in the momentum equation); (5) compute viscous flux at each face by averaging of velocity gradients in adjacent cells and add to cell momentum balance; (6) compute pressure contribution to momentum balance by averaging pressure in adjacent cells and multiplying by face area. After this discrete numerical procedure is complete, the residuals, $R_k^{i,j}$, in the nine center cells in FIG. 7 (those cells labelled with a "+"; each of these cells has a value for u, p, and their gradients and a residual $R_k$) are populated. The norm of the residual is determined by summing the values in the nine center cells and summing the squares of the residual components; this provides the residual norm, L, that is used in the discrete adjoint approach that follows the calculation of the residual norm. The derivative of the residual norm with respect to the flow variables is determined by reverse differentiating the discrete numerical procedure using a discrete adjoint procedure. These derivatives can then be presented directly as input for the back propagation process to update the weights and biases in the neural network.

These derivatives $$\dfrac{\partial L}{\partial u_k^{i,j}} \text{ and } \dfrac{\partial L}{\partial p^{i,j}}$$

resulting from the discrete adjoint procedure can, in one embodiment, be presented directly as input for the back propagation process in the generation neural network (such as the back propagation 57 in FIG. 2A).

Figure 8:
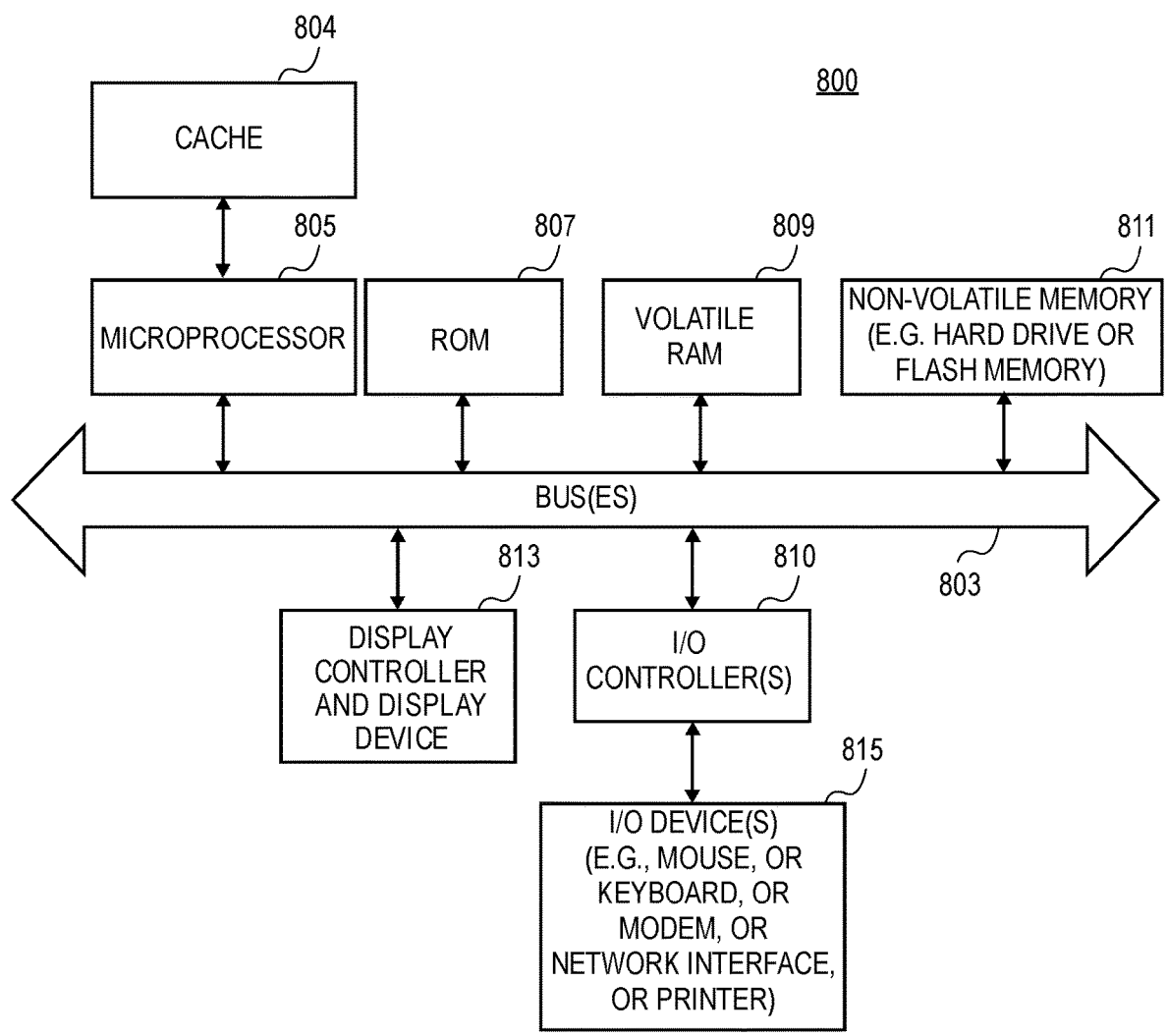
FIG. 8 shows an example of a data processing system which can be used to train a neural network according to one or more embodiments described herein; the example shown in FIG. 8 can also be used to use a trained neural network in a solver according to one or more embodiments described herein.

FIG. 8 shows one example of a data processing system 800, which may be used with one embodiment. For example, the system 800 may be implemented to provide a system that trains a neural network using, for example, the method of FIG. 4, and the system 800 may be implemented to provide a data processing system that uses the trained generative neural network to perform the method shown in FIG. 1. Note that while FIG. 8 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 8, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMS, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMS, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A machine implemented method comprising:
   training a neural network to solve a partial differential equation (PDE) that describes a model or law of physics of a physical system represented as a computational mesh, wherein the neural network comprises an encoder neural network and a generator neural network, and wherein training the neural network comprises:
   receiving, by the encoder neural network, candidate solutions of the PDE for field values in the computational mesh as training inputs for the neural network to produce an intermediate output provided to the generator neural network, wherein the encoder neural network includes a first input layer to receive the candidate solutions to the PDE, and the generator neural network includes a second input layer coupled to an output layer of the encoder neural network, wherein a number of inputs of the first input layer is less than a number of inputs of the second input layer to reduce a dimensionality of inputs received by the neural network;
   generating, by the generator neural network, updated candidate solutions from the intermediate output;
   evaluating the updated candidate solutions using a discriminator, wherein the discriminator comprises a discretized version of the PDE that is an algebraic representation in a discrete numerical form of the PDE, where the algebraic representation can provide valid solutions for the PDE within a solution space in the computational mesh, wherein a residual is computed to indicate a degree of satisfaction of conditions for the updated candidate solutions as valid solutions of the PDE; and
   in response to determining that the updated candidate solutions do not satisfy the conditions for valid solutions of the PDE, updating weights in the neural network, wherein the updated candidate solutions are used as new training inputs to the neural network;
   receiving data describing a design of the physical system;
   performing a simulation for a design of the physical system using the neural network as trained as part of an iterative solver to obtain one or more physical characteristics of the physical system; and
   providing a capability to use results of the simulation to revise the design of the physical system to improve the physical system when fabricated.

2. The method as in claim 1, wherein the discretized version of the PDE is an algebraic representation in discrete numerical form of the PDE in a solution space.

3. The method as in claim 2 wherein the model or law of physics comprises one of:
   Laplace's equation; or Navier-Stokes equations; or fluid flow models; or electromagnetic field models; or acoustic field models; or heat transfer models; or conservation laws of physics; or kinetic equations; or Burger's equation.

4. The method as in claim 2, wherein the method further comprises:
storing the one or more updated candidate solutions as new candidate solutions, the new candidate solutions comprising approximate solutions of the PDE.

5. The method as in claim 3 wherein a batch of solution patches are presented during the training as inputs to the encoder neural network and the outputs from the generator neural network are regenerated solution patches that are evaluated by the discretized version of the PDE, and each batch is presented during a corresponding training epoch.

6. The method as in claim 3 wherein the method further comprises:
determining a net loss function as a weighted sum of a neural network loss function and a PDE discretized loss function based on a residual norm of the discretized version of the PDE.

7. The method of claim 6, wherein the method further comprises:
determining, based on the net loss function, whether training can be stopped or should be continued; and
updating, based on a net loss function derivative, weights in the neural network when training is continued.

8. The method as in claim 7 wherein the discretized version of the PDE comprises an algebraic representation in discrete numerical form of the PDE in a solution space.

9. The method as in claim 8, wherein the iterative solver generates candidate solutions and updates the candidate solutions until each candidate solution converges within a threshold for a convergence criterion.

10. The method as in claim 7, wherein the solutions specified by the discretized version of the PDE can be mapped through explicit steps into a residual field of residual values.

11. The method as in claim 10 wherein the updating of the weights comprises a back propagation through the neural network, the back propagation including a back propagation through a discrete adjoint of the discretized version of the PDE.

12. A method of designing a physical object to be fabricated, the method comprising:
receiving data describing a design of a physical system;
storing data representing a trained neural network that is part of a solver for solving a partial differential equation (PDE) that describes a model or law of physics of the physical system represented by a computational mesh, wherein the neural network comprises an encoder neural network and a generator neural network, and wherein training the neural network comprises:
receiving, by the encoder neural network, candidate solutions of the PDE for field values in the computational mesh as training inputs for the neural network to produce an intermediate output provided to the generator neural network, wherein the encoder neural network includes a first input layer to receive the candidate solutions to the PDE, and the generator neural network includes a second input layer coupled to an output layer of the encoder neural network, wherein a number of inputs of the first input layer is less than a number of inputs of the second input layer to reduce a dimensionality of inputs received by the neural network;
generating, by the generator neural network, updated candidate solutions from the intermediate output;
evaluating the updated candidate solutions using a discriminator, wherein the discriminator comprises a discretized version of the PDE that is an algebraic representation in a discrete numerical form of the PDE, where the algebraic representation can provide valid solutions for the PDE within a solution space in the computational mesh, wherein a residual is computed to indicate a degree of satisfaction of conditions for the updated candidate solutions; and
in response to determining that the updated candidate solutions do not satisfy the conditions for valid solutions of the PDE, updating weights in the neural network, wherein the updated candidate solutions are used as new training inputs to the neural network;
performing a simulation of the physical system using the neural network as trained, the performed simulation producing results about one or more physical characteristics of the physical system; and
revising the design of the physical system based on results of the simulation to improve the physical system when fabricated.

13. The method as in claim 12 wherein the discretized version of the PDE is an algebraic representation in discrete numerical form of the PDE in a solution space.

14. The method as in claim 13 wherein the design is revised to change one or more of (a) one or more sizes of the physical system; (b) a shape of the physical system; or (c) a material composition of the physical system; (d) an orientation of the physical system in the design; or (e) an operating environment as determined by boundary conditions.

15. A non-transitory machine readable medium storing executable program instructions which when executed by a data processing system cause the data processing system to perform a method, the method comprising:
training a neural network to solve a partial differential equation (PDE) that describes a model or law of physics of a physical system represented by a computational mesh, wherein the neural network comprises an encoder neural network and a generator neural network, and wherein training the neural network comprises:
receiving, by the encoder neural network, candidate solutions of the PDE for field values in the computational mesh as training inputs for the neural network to produce an intermediate output provided to the generator neural network, wherein the encoder neural network includes a first input layer to receive the candidate solutions to the PDE, and the generator neural network includes a second input layer coupled to an output layer of the encoder neural network, wherein a number of inputs of the first input layer is less than a number of inputs of the second input layer to reduce a dimensionality of inputs received by the neural network;
generating, by the generator neural network, updated candidate solutions from the intermediate output;
evaluating the updated candidate solutions using a discriminator, wherein the discriminator comprises a discretized version of the PDE that is an algebraic representation in a discrete numerical form of the PDE, where the algebraic representation can provide valid solutions for the PDE within a solution space in the computational mesh, wherein a residual is computed to indicate a degree of satisfaction of conditions for the updated candidate solutions as valid solutions of the PDE; and
in response to determining that the updated candidate solutions do not satisfy the conditions for valid solutions of the PDE, updating weights in the neural network, wherein the updated candidate solutions are used as new training inputs to the neural network; and storing the neural network as trained in a memory of a data processing system, the trained neural network for use in solving the PDE to simulate the physical system in a simulation;

receiving data describing a design of the physical system;

performing the simulation for a design of the physical system using the neural network as trained as part of an iterative solver to obtain one or more physical characteristics of the physical system; and providing a capability to use results of the simulation to revise the design of the physical system to improve the physical system when fabricated.

16. The medium as in claim 15, wherein the discretized version of the PDE is an algebraic representation in discrete numerical form of the PDE in a solution space.

17. The medium as in claim 16, wherein the method further comprises:

storing the one or more updated candidate solutions as new candidate solutions, the new candidate solutions comprising approximate solutions of the PDE.

18. The medium as in claim 15 wherein a batch of solution patches are presented during the training as inputs to the encoder neural network and the outputs from the network are regenerated solution patches that are evaluated by the discretized version of the PDE, and each batch is presented during a corresponding training epoch.

19. The medium as in claim 15 wherein the method further comprises: determining a net loss as a weighted sum of a neural network loss function and a PDE discretized loss function based on a residual norm of the discretized version of the PDE.

* * * * *